J. E. CARNAHAN.
GAS BURNER.
APPLICATION FILED MAY 18, 1912.
1,105,250.
Patented July 28, 1914.
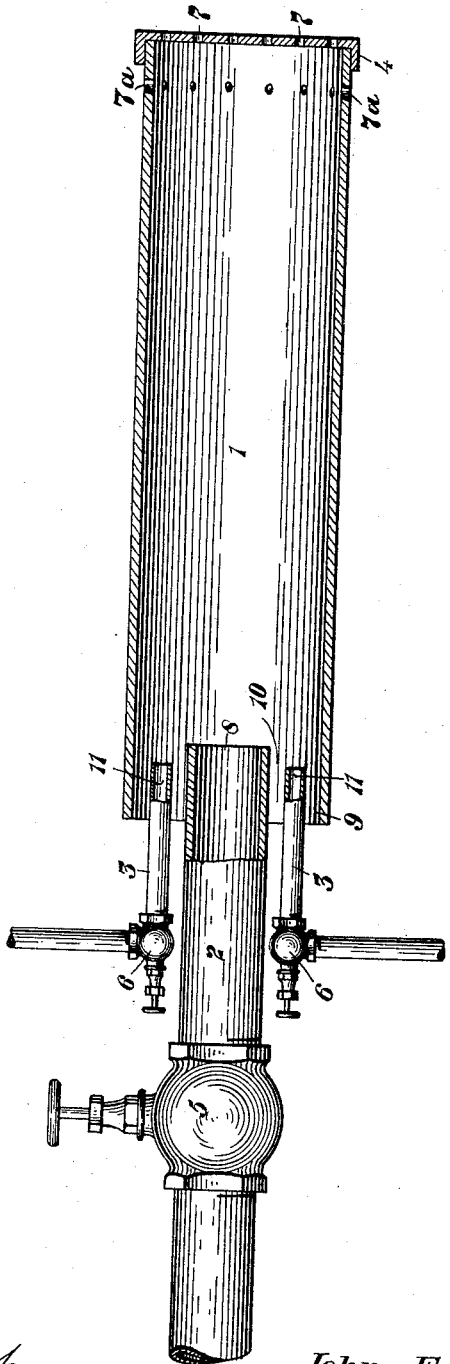
Witnesses:
Inventor
John E. Carnahan.
By Harry Frease
Attorney.

UNITED STATES PATENT OFFICE.

JOHN E. CARNAHAN, OF CANTON, OHIO.

GAS-BURNER.

1,105,250.  Specification of Letters Patent.  Patented July 28, 1914.

Application filed May 18, 1912. Serial No. 698,106.

*To all whom it may concern:*

Be it known that I, JOHN E. CARNAHAN, a citizen of the United States, residing at Canton, in the county of Stark and State of Ohio, have invented certain new and useful Improvements in Gas-Burners, of which the following is a specification.

The invention relates to a burner for mixing air with gas to cause complete combustion, and especially to burners for consuming natural or other gases having a varying pressure; and the object of the improvement is to provide means for insuring the presence of a sufficient amount of air in the mixing chamber for a proper combustion of the gas, for facilitating the flow of gas when the pressure is weak, and for effecting a proper mixing of the gas and air within the mixing tube and a distribution of the flame at the outlet thereof.

A preferred embodiment of the invention is illustrated in the accompanying drawing, forming part hereof, in which the figure is a side elevation, partly in longitudinal section, of the improved burner, and in which similar numerals refer to similar parts throughout the drawing.

The burner includes the mixing tube 1, the gas pipe 2 and one or more steam pipes 3; the mixing tube being open at its rear inlet end and being preferably provided with the distributing cap 4 on its forward outlet end, the gas pipe being open at its forward discharge end and being preferably provided with the controlling valve 5, and the steam pipes being preferably provided with the controlling valves 6.

The forward or outlet end of the mixing tube 1 is shaped as an elongated open-ended cylinder, and is partially closed at its forward end by the distributing cap 4 which is provided with numerous apertures 7 for effecting a thorough mixing and proper distribution of the flame.

The forward or discharge end 8 of the gas pipe is inserted a substantial distance into and within the rear or inlet end 9 of the mixing tube, and is of sufficiently less diameter than the mixing tube so that the annular channel 10 is formed around the inserted end of the gas pipe; and the forward or discharge ends 11 of the steam pipes are also inserted a substantial distance into and within the end of the mixing tube in the annular interval 10 around the gas pipe, which steam pipes preferably terminate short of the discharge end of the gas pipe.

In the operation of the burner, the gas flows forward from the discharge end of the gas pipe into and through the mixing tube, and, when the pressure of the gas is high enough, the suction caused thereby draws a sufficient amount of air into the mixing tube, through the annular channel in its rear open end around the gas pipe, to cause a proper combustion of the gas; and the mixing of the gas and air is facilitated by the baffle formed by the distributing head, which may be functionally referred to as a distributing baffle.

When the pressure of the gas is too low to cause a sufficient suction of air through the rear end of the mixing tube, the valves in one or more of the steam pipes are opened, and the discharge of steam therefrom in the annular channel around the discharge end of the gas pipe not only creates a positive suction of air through the rear end of the mixing tube, but also creates such a suction at the discharge end of the gas pipe as to facilitate the flow of gas therefrom, thus increasing the volume of flame.

It will be understood that the use of the steam pipes is not essential when the pressure of gas is high enough to create a proper suction of air around the discharge end of the gas pipe; and furthermore that compressed air may be substituted for steam to supplement the suction caused by the flow of gas, or to facilitate the flow of gas. And the apertures $7^a$ may be provided around the end of the mixing tube for a further distribution of the flame.

I claim:

A gas burner including a mixing tube having a distributing baffle at its forward end, and having its rear-end open, a gas pipe of less diameter than the mixing tube, having its forward-outlet end open and inserted a substantial distance into and within the rear-inlet end of the mixing tube forming an annular channel around the inserted end of the gas pipe, and one or more steam pipes having their discharge ends inserted a substantial distance into and within said annular channel and terminating short of the gas pipe.

JOHN E. CARNAHAN.

Witnesses:
A. J. MASKREY,
CHAS. M. BALL.

Copies of this patent may be obtained for five cents each, by addressing the "Commissioner of Patents, Washington, D. C."